US010732679B2

(12) United States Patent
Wu et al.

(10) Patent No.: US 10,732,679 B2
(45) Date of Patent: Aug. 4, 2020

(54) PORTABLE INFORMATION HANDLING SYSTEM LOW HEIGHT MONO BARREL HINGE (71) Applicant: Dell Products L.P., Round Rock, TX (US)

(72) Inventors: Chin-Chung Wu, Taipei (TW); Hsien-Wei Chen, New Taipei (TW); Chih-Ping Chang, Taipei (TW); Te-Sen Chin, Taipei (TW); An-Chung Hsieh, New Taipei (TW); Jihun Yeom, Seoul (KR); Anthony J. Sanchez, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/205,676

(22) Filed: Nov. 30, 2018

(65) Prior Publication Data
US 2020/0174530 A1    Jun. 4, 2020

(51) Int. Cl.
*G06F 1/16* (2006.01)
*E05D 3/06* (2006.01)
(Continued)

(52) U.S. Cl.
CPC .......... *G06F 1/1681* (2013.01); *G06F 1/1616* (2013.01); *G06F 1/1618* (2013.01); *G06F 1/1643* (2013.01); *G06F 3/0202* (2013.01); *G09G 5/006* (2013.01); *E05D 3/06* (2013.01); *E05D 3/122* (2013.01); *E05D 11/00* (2013.01); *E05D 11/0081* (2013.01); *G06F 1/1683* (2013.01); *H04M 1/022* (2013.01);
(Continued)

(58) Field of Classification Search
CPC .......... E05D 3/12; E05D 3/122; E05D 3/022; E05D 3/06; E05D 5/10; E05D 7/00; E05D 11/00; E05D 11/0081; E05D 2005/102; G06F 1/16; G06F 1/1613; G06F 1/1615; G06F 1/1616; G06F 1/1618; G06F 1/162; G06F 1/1622; G06F 1/641; G06F 1/1643; G06F 1/1647; G06F 1/1649; G06F 1/1669; G06F 1/1681; G06F 1/1683; G06F 1/203; G06F 3/0202; G06F 3/1423; G06F 3/04897; G06F 13/00; G09G 5/006; H01H 13/83; H01H 2219/004; H04M 1/0216; H04M 1/022; H04M 1/0227; H04M 1/0247; H04M 1/0208; H04M 1/0206
See application file for complete search history.

(56) References Cited

U.S. PATENT DOCUMENTS

5,001,659 A  *  3/1991  Watabe ................. G06F 1/1616
                                                  16/221
5,043,846 A  *  8/1991  Kinoshita .............. F16M 11/10
                                                  16/308
(Continued)

*Primary Examiner* — Michael J Eurice
(74) *Attorney, Agent, or Firm* — Zagorin Cave LLP; Robert W. Holland (57) ABSTRACT A portable information handling system rotationally couples housing portions with a mono barrel hinge having sequential axle rotation about 360 degrees. A dual eccentric shaft hinge element rotates each axle about a cable routed between the axles so that a full 360 degrees of rotation is achieve with a thin height profile. Each axle shaft has a flat face that is maintained adjacent the cable rotating with an eccentric pattern relative to the cable.

20 Claims, 9 Drawing Sheets (51) Int. Cl.
  *E05D 3/12* (2006.01)
  *E05D 7/00* (2006.01)
  *E05D 11/00* (2006.01)
  *G06F 3/02* (2006.01)
  *G09G 5/00* (2006.01)
  *H04M 1/02* (2006.01)

(52) U.S. Cl.
  CPC ........ *H04M 1/0208* (2013.01); *H04M 1/0216* (2013.01); *H04M 1/0227* (2013.01)

(56) References Cited

U.S. PATENT DOCUMENTS

| | | | | |
|---|---|---|---|---|
| 5,238,421 | A * | 8/1993 | Kobayashi | G06F 1/1616 16/337 |
| 5,240,427 | A * | 8/1993 | Kobayashi | G06F 1/1616 16/337 |
| 5,379,183 | A * | 1/1995 | Okonsky | G06F 1/1616 16/342 |
| 5,383,138 | A * | 1/1995 | Motoyama | E05C 1/16 361/679.27 |
| 5,880,929 | A * | 3/1999 | Bhatia | G06F 1/203 165/104.33 |
| 6,392,883 | B1 * | 5/2002 | Ali | G06F 1/203 165/185 |
| 7,826,205 | B2 * | 11/2010 | Smith | G06F 1/16 361/679.02 |
| 9,042,089 | B2 * | 5/2015 | Degner | G06F 1/1681 361/679.09 |
| 9,413,056 | B2 * | 8/2016 | Hu | H01Q 1/24 |
| 9,684,343 | B2 * | 6/2017 | Tazbaz | G06F 1/1618 |
| 9,927,845 | B1 * | 3/2018 | Holung | G06F 1/1681 |
| 10,152,094 | B1 * | 12/2018 | Holung | E05D 3/122 |
| 10,425,711 | B2 * | 9/2019 | Ent | H04R 1/026 |
| 2002/0001172 | A1 * | 1/2002 | Maatta | G06F 1/1616 361/679.06 |
| 2003/0123232 | A1 * | 7/2003 | Huang | G06F 1/1616 361/751 |
| 2004/0061999 | A1 * | 4/2004 | Takemoto | G06F 1/162 361/679.07 |
| 2005/0236869 | A1 * | 10/2005 | Ka | G06F 1/1616 296/192 |
| 2006/0059661 | A1 * | 3/2006 | Higano | G06F 1/162 16/366 |
| 2008/0026802 | A1 * | 1/2008 | Carlson | G06F 1/1616 455/575.1 |
| 2009/0156260 | A1 * | 6/2009 | Derengowski | H01R 35/00 455/566 |
| 2010/0134964 | A1 * | 6/2010 | Smith | B60R 11/0252 361/679.2 |
| 2011/0063809 | A1 * | 3/2011 | Hoshino | G06F 1/1616 361/752 |
| 2011/0102979 | A1 * | 5/2011 | Jinkinson | G06F 1/1616 361/679.01 |
| 2011/0102986 | A1 * | 5/2011 | Asakura | G06F 1/1616 361/679.01 |
| 2011/0222260 | A1 * | 9/2011 | Goro | G06F 1/1681 361/814 |
| 2012/0057280 | A1 * | 3/2012 | Hoshino | G06F 1/1681 361/679.01 |
| 2014/0029183 | A1 * | 1/2014 | Ashcraft | G06F 1/26 361/679.4 |
| 2014/0078116 | A1 * | 3/2014 | Mercea | G06F 1/266 345/179 |
| 2014/0132459 | A1 * | 5/2014 | Hu | H01Q 1/24 343/702 |
| 2016/0040462 | A1 * | 2/2016 | Nakamura | H04M 1/0247 361/679.27 |
| 2016/0044803 | A1 * | 2/2016 | Nakamura | G06F 1/16 361/679.01 |
| 2016/0130849 | A1 * | 5/2016 | Cheah | E05D 11/0081 361/679.27 |
| 2017/0220077 | A1 * | 8/2017 | Holung | G06F 1/1681 |
| 2017/0222456 | A1 * | 8/2017 | Perez | G06F 1/1681 |
| 2018/0184185 | A1 * | 6/2018 | Ent | H04R 1/026 |
| 2018/0246546 | A1 * | 8/2018 | Ghosh | G06F 1/16 |
| 2018/0329462 | A1 * | 11/2018 | Larsen | G06F 1/1681 |
| 2019/0194990 | A1 * | 6/2019 | Yoo | E05D 11/0081 |

* cited by examiner

FIG. 8M

PORTABLE INFORMATION HANDLING SYSTEM LOW HEIGHT MONO BARREL HINGE

BACKGROUND OF THE INVENTION

Field of the Invention

The present invention relates in general to the field of portable information handling systems, and more particularly to a portable information handling system low height mono barrel hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally have processing components, input/output (I/O) devices and a battery integrated in a portable housing to enable operations free from external resources. End users tend to rely upon portable information handling systems to perform processing tasks when traveling away from an enterprise or home office, such as during business meetings or airplane flights. To enhance portability, end users generally prefer small and light weight information handling systems. Generally, the size and weight of a portable information handling system is a tradeoff between portability and processing capabilities. Typically portable information handling system width and length are driven by the surface area of a flat panel display integrated in the system. Generally, system height is driven by the size and capabilities of processing components disposed in the housing. Reduced system height tends to decrease system weight and improve system portability with decreased system capability driven by reduced space for processing components and active thermal management, such as a cooling fan.

Often portable information handling systems have plural portions rotationally coupled to each other to improve portability. For example, a convertible information handling system typically includes a lid portion that integrates a display and a main portion that integrates processing components and a keyboard. Convertible information handling systems convert from a closed configuration having the lid and display closed against the keyboard to a clamshell configuration having the lid and display rotated ninety degrees relative to the main portion so that the display is held in a viewing position over the keyboard. In some systems, the lid rotates 360 degrees relative to the main portion to hold the display in a tablet mode. The tablet mode provides a convenient configuration for consuming data, such as reading a web page or email. In the tablet mode, the end user performs inputs with touches at the display.

Information handling system typically provide 360 degrees of rotation for housing portions to achieve a tablet mode by using a two axle hinge. In thin height systems, a five knuckle hinge design generally provides more options for wire routing between the housing portions. A five knuckle hinge design uses two separate hinges spaced apart from each other so that wires may route between the hinges. In particular, where hinges include gears, having separate hinges allows wire routing on the side of the hinge opposite the gears. By contrast, three knuckle hinge designs interconnect the hinges with a barrel that provides increased robustness and stability yet limits cable routing to an area on the outside of the hinges. A difficulty with three knuckle hinge designs is that three knuckle mono barrel hinges tend to have a larger size built around a hinge cap, i.e. the barrel coupling the hinges together, which has to provide room for both hinge shafts and cable routing at the outer periphery of the information handling system. The barrel size drives a minimum system height that tends to be taller than desired in low height systems.

SUMMARY OF THE INVENTION

Therefore, a need has arisen for a system and method which rotationally couples portable information handling system housing portions with a low height mono barrel hinge.

In accordance with the present invention, a system and method are provided which substantially reduce the disadvantages and problems associated with previous methods and systems for rotationally coupling housing portions with a mono barrel hinge. First and second hinge elements couple at opposing ends of a barrel element to provide dual axle sequenced rotation of information handling system housing portions. A cable routed between dual axles of a hinge element is maintained adjacent a flat surface of each axle with eccentric rotational movement of the first and second axles.

More specifically, an information handling system processes information with processing components disposed in a main housing portion, such as a central processing unit (CPU), memory and graphics processing unit (GPU), for presentation as visual images at a display integrated in a lid housing portion. The main and lid housing portions rotationally couple with a mono barrel hinge that rotates about dual axles in sequence. A cable routes between the main and lid housing portions, such as a display cable that communicates display information, by passing between the dual axles. Eccentric rotational motion of the dual axles maintains a flat surface of each axle adjacent the cable to provide a low height profile hinge. The barrel element disposed between opposing sequential dual axle hinge elements provides a space to accept functional elements, such as for stylus stowage, audio speakers or a sub-display.

The present invention provides a number of important technical advantages. One example of an important technical advantage is that a mono barrel hinge rotationally couples information handling system housing portions with a reduced height for use in low profile portable information handling systems. Hinge cap and barrel size is reduced by a dual-eccentric shaft design rotated in a sequential manner to form a gap for cable passage. The effect is to essentially rotate an axle shaft about the cable by facing a flat shaft surface of each shaft towards the cable during rotational movement. The barrel structure between sequential hinge elements provides robust structural integrity and space to include information handling system functional elements, such as stowage for a stylus, room for an audio speaker, wireless antennae and a sub-display for presenting visual information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A low height barrel hinge rotationally couples information handling system housing portions with a dual eccentric shaft structure. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
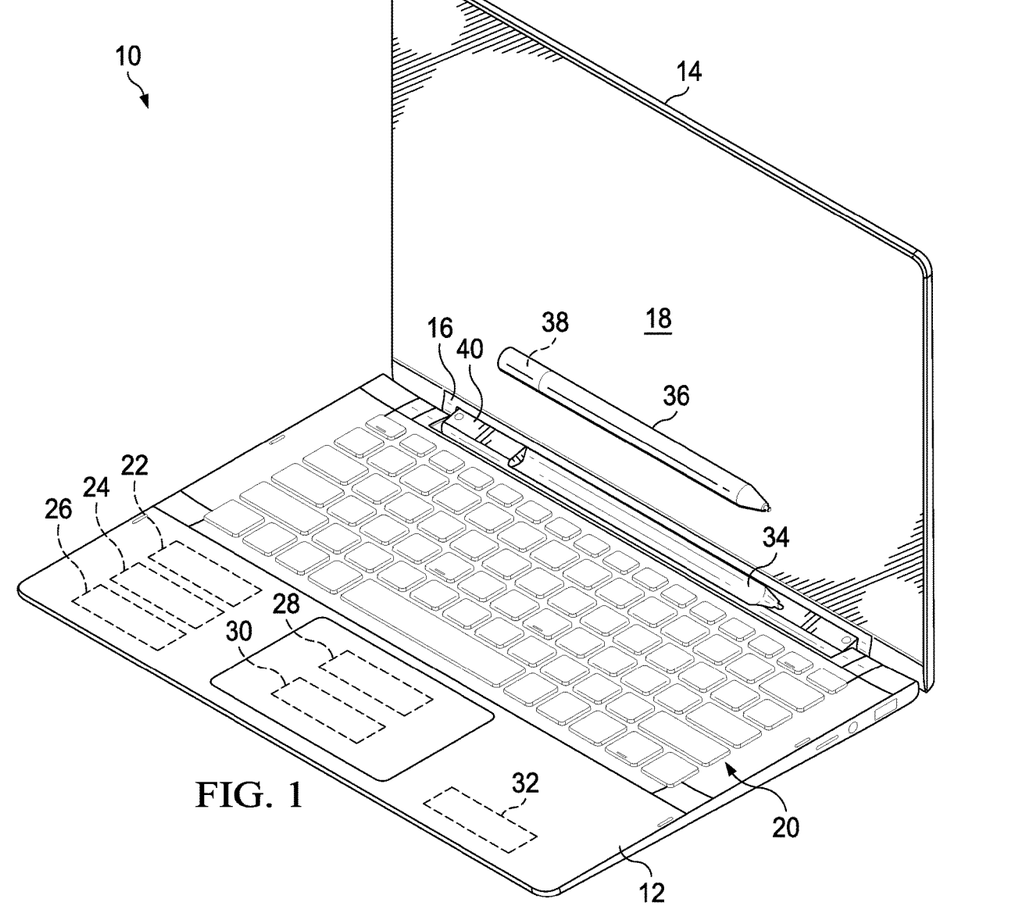
FIG. 1 depicts an information handling system in an open clamshell position having a stylus garage integrated in a barrel hinge.

Referring now to FIG. 1, an information handling system 10 is depicted in an open clamshell position having a stylus garage integrated in a mono barrel hinge 16. Information handling system 10 has a portable configuration built with a main housing portion 12 rotationally coupled to a lid housing portion 14 by mono barrel hinge 16. In the example embodiment, lid housing portion 14 has rotated approximately 90 degrees relative to main housing portion 12 to achieve a clamshell configuration in which a display 18 integrated in lid housing portion 14 is held in a viewing position substantially perpendicular relative to a keyboard 20 integrated in main housing portion 12. In the clamshell configuration, an end user may perform typed inputs at keyboard 20 while viewing display 18. Main housing portion 12 integrates a variety of processing components that cooperate to process information for presentation as visual images at display 18. For example, a central processing unit (CPU) 22 executes instructions to process information with the instructions and information stored in random access memory (RAM) 24. A solid state drive (SSD) 26 provides persistent storage of information during power down of the processing components. For instance, SSD 26 stores the operating system and applications for retrieval at boot to RAM 24. A chipset 28 supports operations of CPU 22, such as with graphics and memory management. An embedded controller 30 provides management of physical components, such as power and input/output (I/O) devices. For example, embedded controller 30 processes keyboard 20 inputs and touch inputs made at a capacitive touch detection layer of display 18, and reports the inputs to CPU 22. A graphics processing unit (GPU) 32 processes information provided from CPU 22 to define visual images for presentation at display 18, such as by sending pixel values to display 18. In various embodiments, various arrangements of processing components may be used in information handling system 10 to achieve desired processing capabilities.

In the example embodiment, mono barrel hinge 16 includes sequential hinge elements so that the barrel rotates in a defined manner relative to the housing portions. For example, a depression 34 formed in hinge 16 to have the shape of a stylus 36 provides a stylus garage for stowing stylus 36 when not in use. Depression 34 rotates as defined by sequential motion of mono barrel hinge 16 so that in the clamshell position depicted by FIG. 1, stylus 36 is exposed to an end user so that the end user may grasp stylus 36 and remove stylus 36 from depression 34 for use as a writing utensil at display 18. A magnet 38 in stylus 36 interacts with a hall sensor 40 disposed in information handling system 10 at the garage to detect when stylus 36 is garaged or removed. In alternative embodiments, mono barrel hinge 16 may provide space to support alternative functionality, such as an audio speaker that presents sounds or a sub-display that presents visual images.

Mono barrel hinge 16 offers several advantages for rotationally coupling main housing portion 12 and lid housing portion 14 with a three-knuckle configuration relative to the use of separate hinge elements in a five knuckle configuration. For example, in thin or low Z portable information handling systems, interconnecting hinge elements with a barrel between them provides robustness with the barrel structure that reduces housing flexure. Sequential motion of mono barrel hinge 16, such as driven by a sequencing mechanism, ensures an orientation of depression 34 that moves in a predictable manner relative to housing portions 12 and 14. For instance, in the example embodiment at ninety degrees of rotation from a closed position to the depicted clamshell position, depression 34 rotates to fully expose stylus 36. If housing portions 12 and 14 rotate to a closed position having display 18 directly over keyboard 20, depression 34 rotates to face a central location of information handling system 10, effectively locking stylus 36 within information handling system 10. If housing portions 12 and 14 rotate 360 degrees from the closed position to a tablet position having display 18 exposed and keyboard 20 at a bottom location, depression 34 rotates to face outward from the central location so that it is fully exposed to an end user grasp. Similar orientations may be achieved with a synchronized hinge that rotates housing portions 12 and 14 in a synchronized manner.

Figure 2:
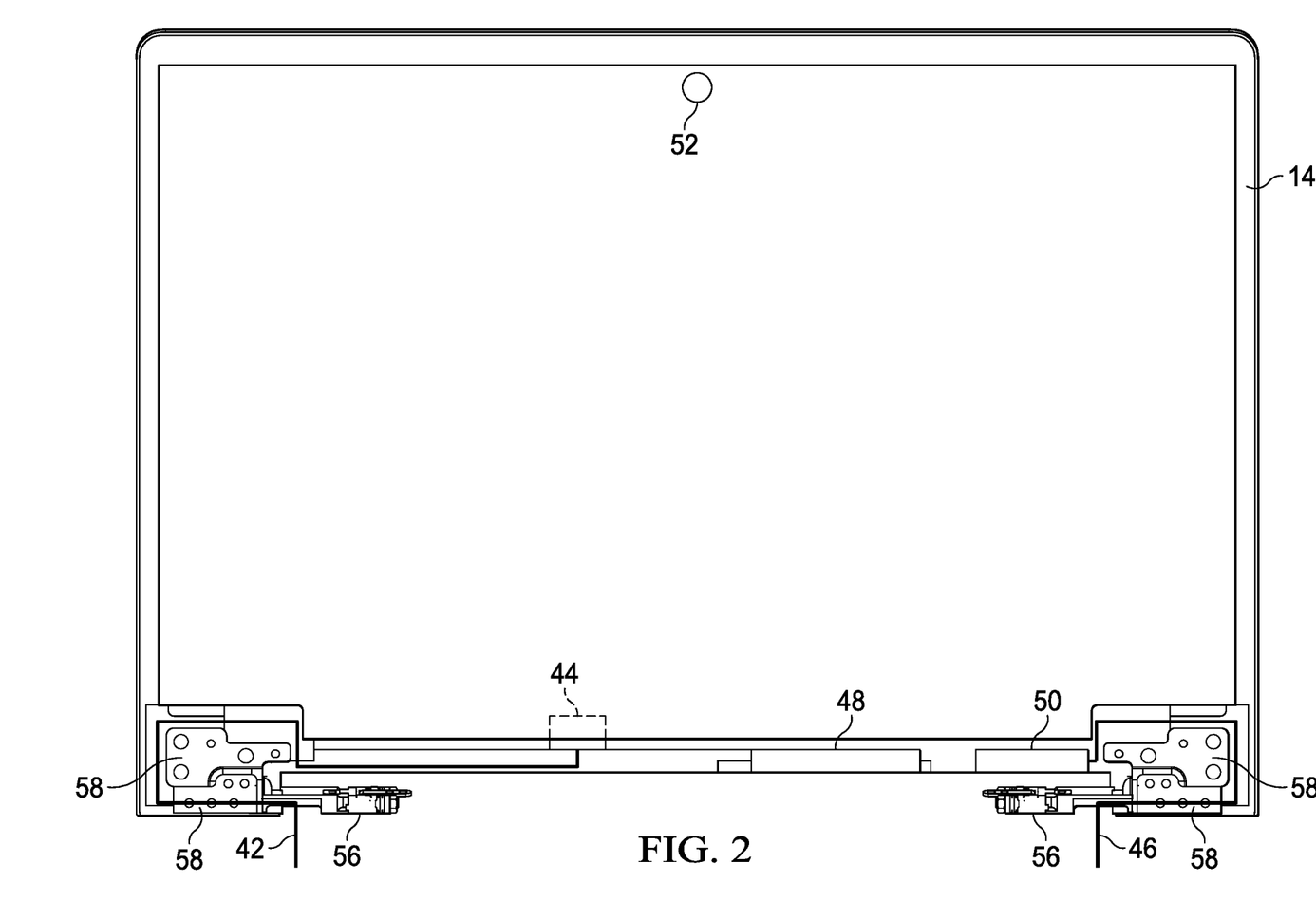
FIG. 2 depicts a top view of the information handling system lid portion having cables routed through each sequential hinge element.

Referring now to FIG. 2, a top view depicts the information handling system lid portion 14 having cables routed through each sequential hinge element 56. In the example embodiment, a display cable 42 routes to an axis of hinge element 56 and parallel to the axis to pass out of hinge element 56 outside of bracket 58 that couples hinge element 56 to lid portion 14. Display cable 42 communicates display information from GPU 32 to a display timing controller (TCON) 44 that scans the display information to pixels of display 18. At an opposing hinge element 56 on the opposite side of barrel hinge 16, a data link cable 46 provides data communication between various components of lid housing portion 14 and main housing portion 12. In the example embodiment, a touch controller 48, E-compass 50 and camera 52 interface with processing components of main housing portion 12 through data link cable 46. As with display cable 42, data link cable 46 enters hinge element 56 and routes parallel to the hinge shaft and around bracket 58 to pass into lid housing portion 14. As is set forth below in greater detail, dual eccentric shaft movement supports cable routing through hinge element 56 with a low height profile.

Figure 3:
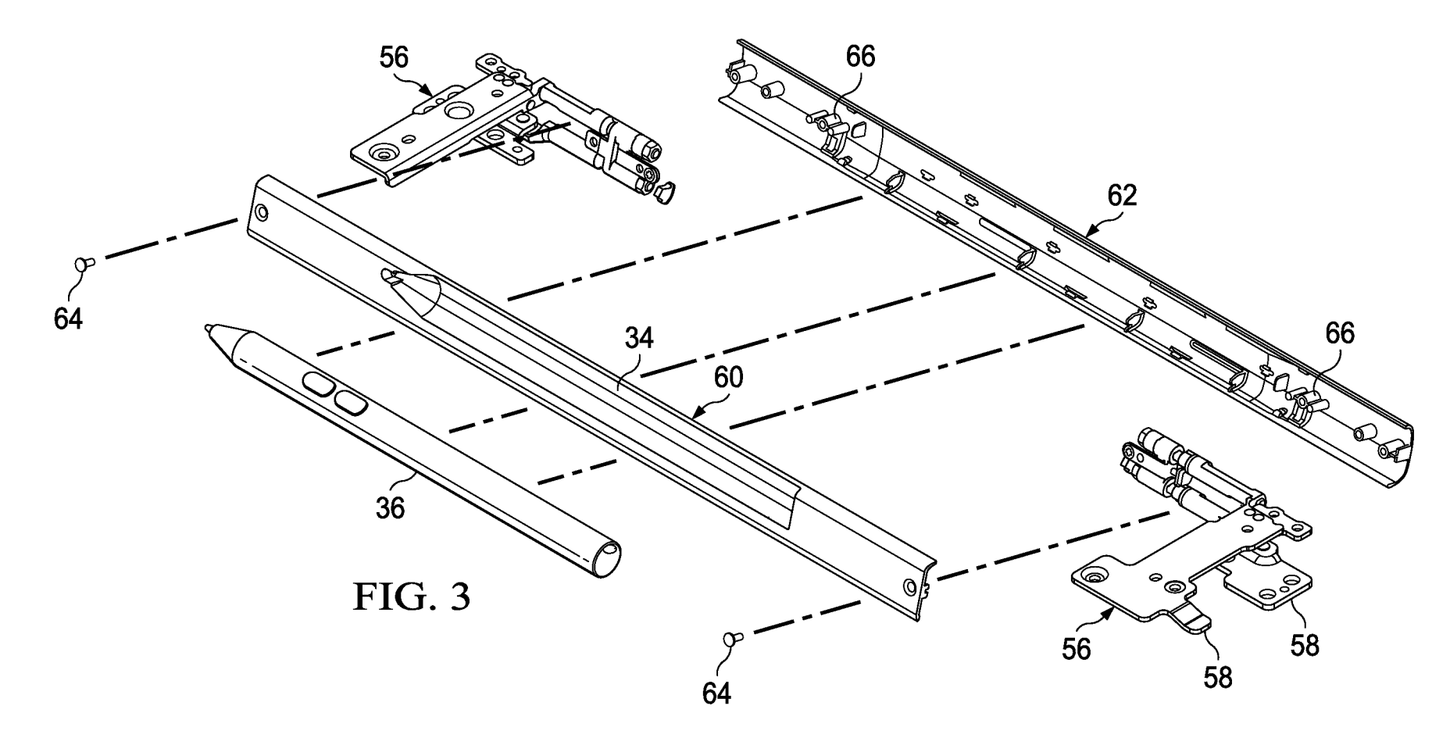
FIG. 3 depicts an exploded side perspective view of a barrel hinge having a stylus garage that accepts a stylus.

Referring now to FIG. 3, an exploded side perspective view depicts a barrel hinge 16 having a stylus garage 34 that accepts a stylus 36. In the example embodiment, first and second sequential dual axis hinge elements 56 integrate at opposing ends of barrel hinge 16 to support 360 degrees of rotational movement of the housing portions relative to each other. A barrel element inner portion 60 has depression 34 formed in it to provide the stylus garage for stowing stylus 36. A barrel element outer portion 62 includes hinge element guides 66 that align hinge elements 56 into place for capture between barrel element 60 and 62. Screws 64 or other coupling devices secure barrel elements 60 and 62 to each other so that hinge elements 56 are captured within the assembled barrel. Each hinge element 56 has first and second brackets 58 that couple to first and second information handling system housing portions. In the example embodiment, communications between the housing portions are supported with wirelines routed through the hinge elements 56 as depicted in FIG. 2 to leave empty the barrel region between hinge elements 56.

Figure 4:
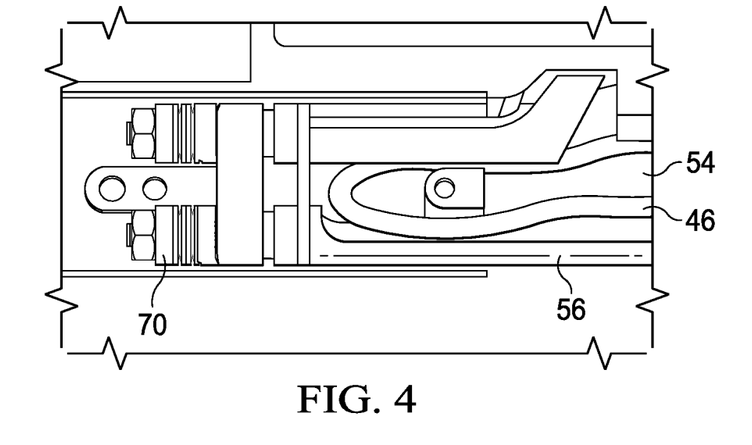
FIG. 4 depicts a top view of an example embodiment of cable routing through a sequential hinge element between information handling system housing portion.

Referring now to FIG. 4, a top view depicts an example embodiment of cable routing through a sequential hinge element 56 between information handling system housing portions 12 and 14. Hinge element 56 couples with a screw to one end of barrel element outer portion 62 with a hinge element guide 66 aligning hinge element 56. A cable guide 54 extends upward from hinge element guide 66 between dual shafts of hinge element 56. In the example embodiment, cable guide 54 has a rounded surface directed towards a sequencer 70 of hinge element 56 and a screw opening that accepts screw 64 passed through barrel element inner portion 60 to assemble barrel hinge 16 with hinge element 56 captured between portions 60 and 62. Cable 46 enters hinge element 56 from a first housing portion and routes along a hinge shaft to cable guide 54. Cable 46 passes around cable guide 54 to proceed in an opposite direction down the opposite shaft of hinge element 56 and out to the second housing portion. As is set forth in greater detail below, eccentric sequential shaft motion about cable 46 supports routing between the shafts with a low height profile within the constraints of a mono barrel hinge structure.

Figure 5:
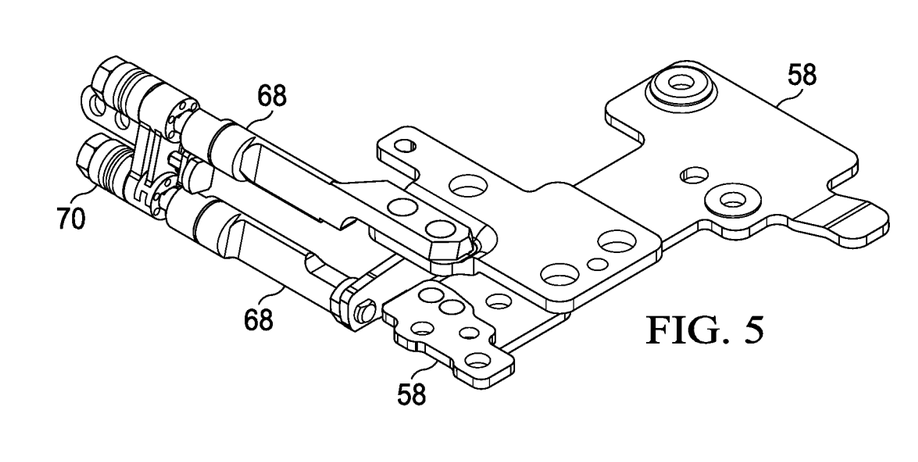
FIG. 5 depicts an upper perspective view of a hinge element configured to fit into a barrel hinge.

Referring now to FIG. 5, an upper perspective view depicts a hinge element 56 configured to fit into a barrel hinge. In the example embodiment, dual eccentric shafts 68 extend from a sequencer 70 to rotate in an eccentric pattern about a central region between shafts 68. Each shaft 68 terminates at a bracket 58 that couples to a housing portion. Relative rotational movement of housing portions coupled to brackets 58 is defined by sequencer 70, which controls rotation of shafts 68 based upon rotational position of each shaft 68. Each shaft 68 has a circular base that inserts into sequencer 70 to rotate about a central axis of the circular form. As each shaft 68 extends from sequencer 70 towards bracket 58, a flat surface is defined by removing one-half of the shaft. The flat surface faces adjacent the location of a cable passing by the shaft 68 and maintains the adjacent location to the cable with eccentric motion of the flat portion rotated about the central axis of the full round shaft 68 form within sequencer 70. In the example embodiment, sequential 360 degree motion of hinge shafts 68 are managed by rotating each shaft 68 180 degrees while the other shaft remains stationary relative to sequencer 70. In alternative embodiments, sequential movement of shafts 68 may take place at alternative rotational orientations, such as in 90 degree alternating sequences. Sequencer 70 may include any type of sequencing mechanism that controls shaft 68 rotation to occur in sequential motion of one shaft at a time followed by the other. Further, sequencer 70 may include additional eccentric motion to one or both shafts 68 by providing rotation off center from the central axis of the round portion of shaft 68.

Figure 6:
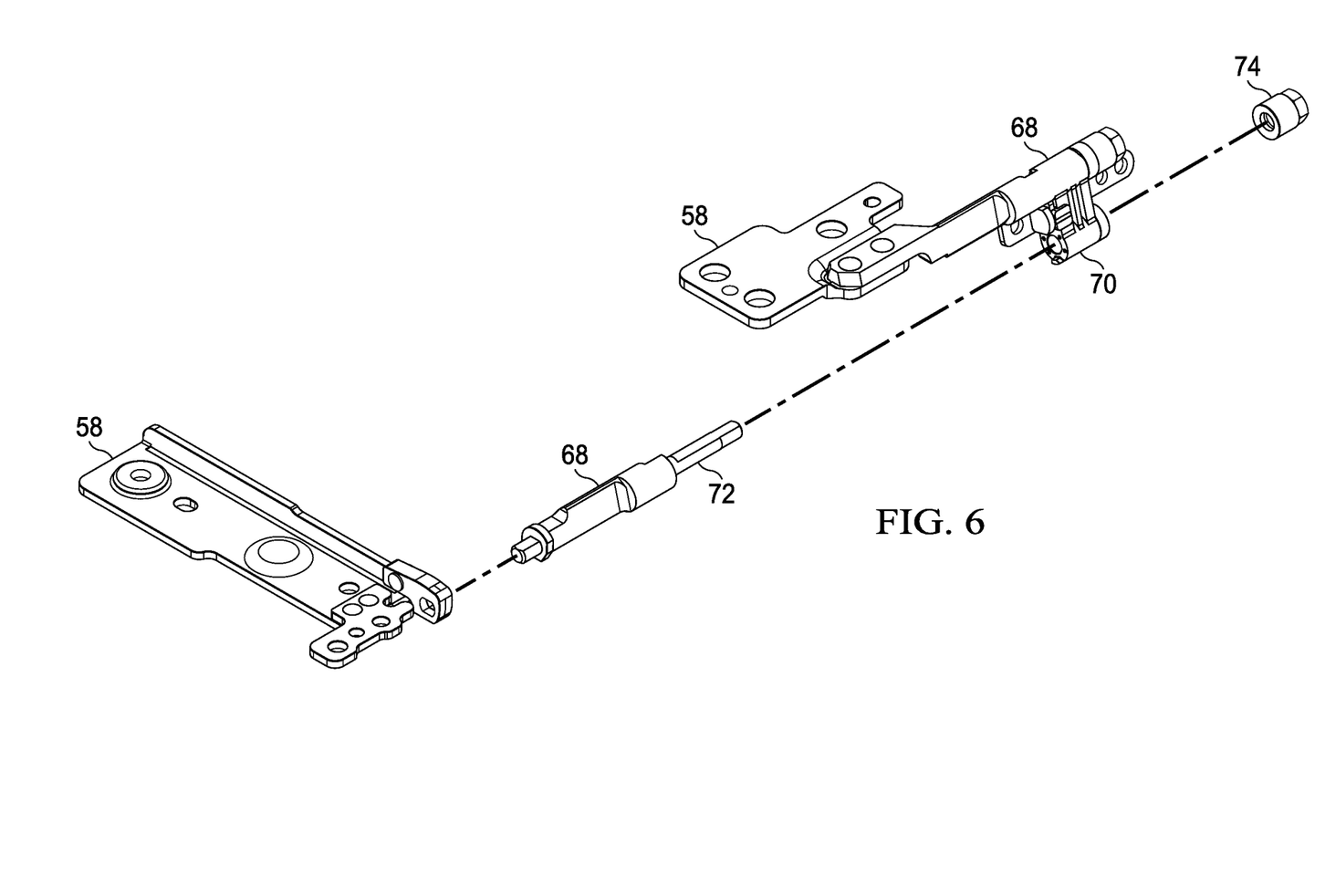
FIG. 6 depicts an exploded view of a hinge element shaft having a flat surface rotated with an eccentric movement about a central axis of an axle.

Referring now to FIG. 6, an exploded view of hinge element 56 depicts shaft 68 having a flat surface rotated with an eccentric movement about a central axis of an axle 72. Axle 72 slides into an opening of sequencer 70 and is captured by an end cap 74. In the example embodiment, square or rectangular shaped insertion members with orientation indents ensures that shaft 68 inserts at a correct orientation and bracket 58 couples at a correct orientation.

Figure 7A:
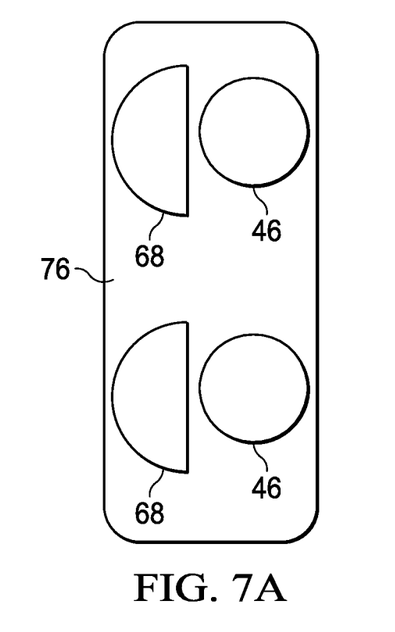
FIGS. 7A and 7B depict a comparison of dimensions for a barrel end cap having eccentric sequential shaft rotational motion and synchronized rotational motion.
Figure 7B:
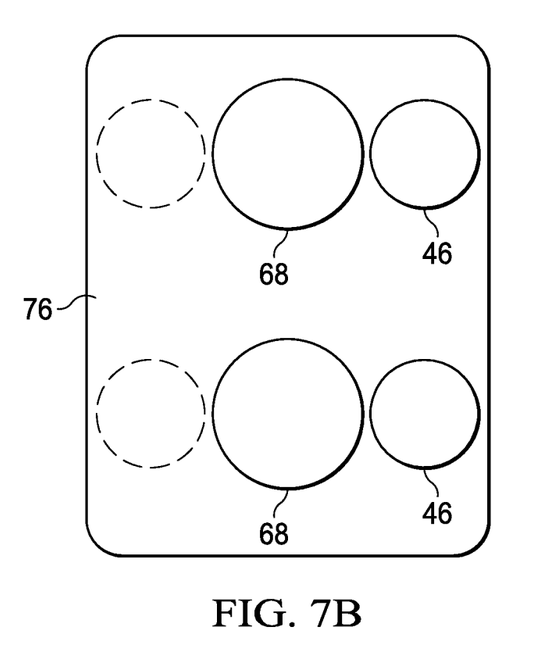

Referring now to FIGS. 7A and 7B, a comparison depict dimensions for a barrel end cap having eccentric sequential shaft rotational motion and synchronized rotational motion. FIG. 7A illustrates each hinge shaft 68 having a flat surface adjacent cable 46 so that the hinge cap 76 that encloses shafts 68 and cable 46 has a height of just the height of shaft 68 and cable 46. FIG. 7B depicts a full shaft 68 thickness with a cable 46 adjacent to it and space sufficient to move cable 46 to an opposite side of shaft 68. As is apparent, the relative motion of cable 46 to an opposing side of shaft 68, such as is introduced with normal synchronized rotation, increases the size of hinge cap 76 to accommodate each rotational position. Sequential eccentric motion of shafts 68 as supported by FIG. 7A, which maintains cable 46 at the flat surface of shaft 68 throughout rotational movement has a total height of only one-half of a shaft thickness (i.e., the thickness at the flat surface) plus the cable thickness.

Figure 8A:
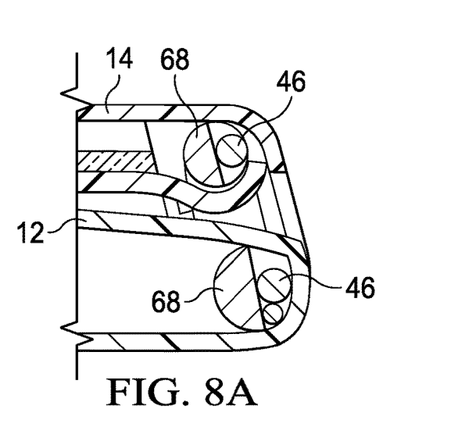
FIGS. 8A through 8M depict sequential rotation from a closed position depicted by FIG. 8A with zero rotation to a tablet position depicted by FIG. 8M with 360 degrees of rotation to illustrate an example of sequential eccentric hinge rotation to support a low height mono barrel hinge.
Figure 8B:
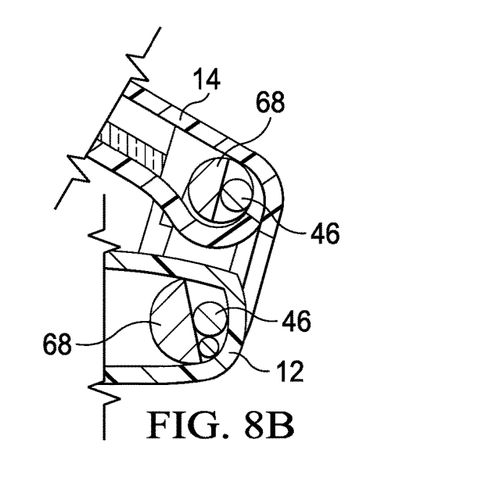
Figure 8C:
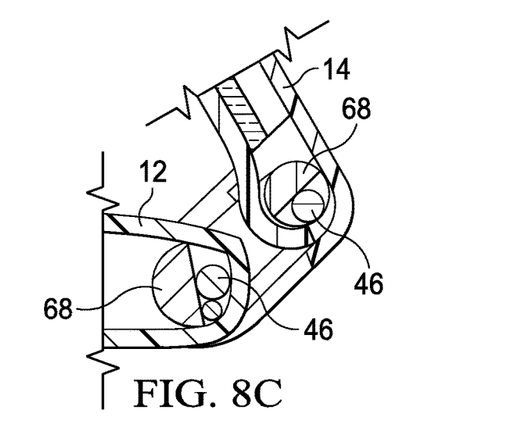
Figure 8D:
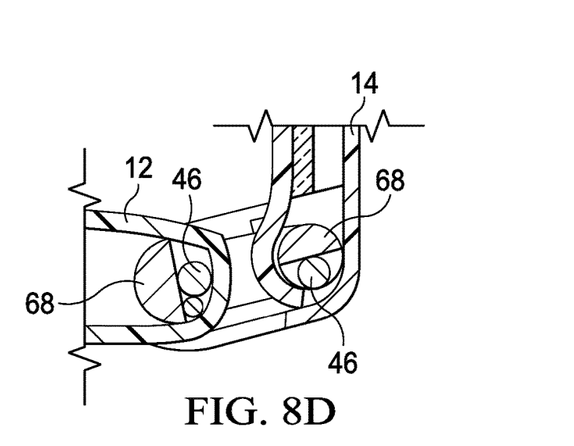
Figure 8E:
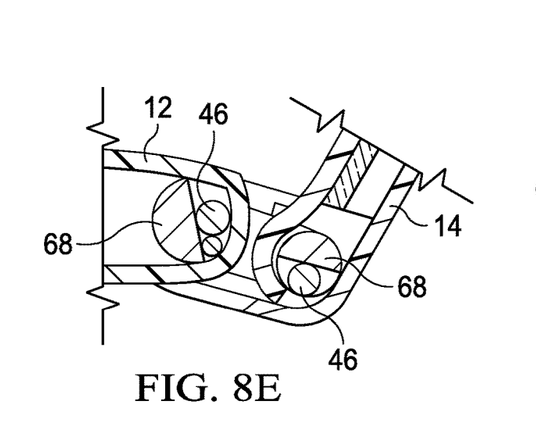
Figure 8F:
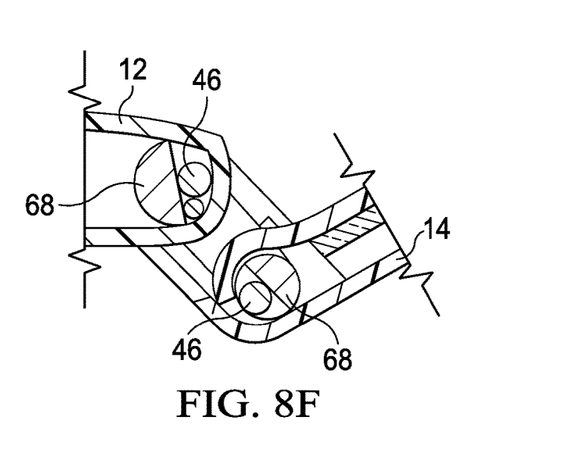
Figure 8G:
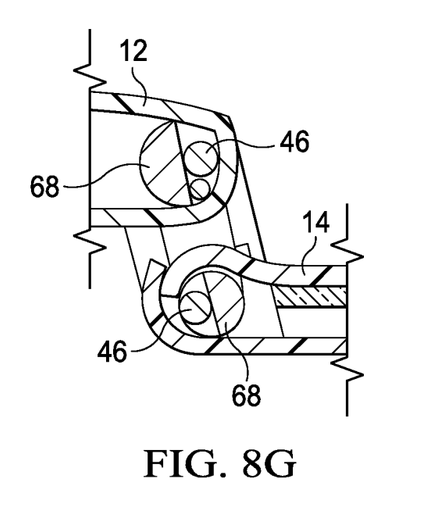
Figure 8H:
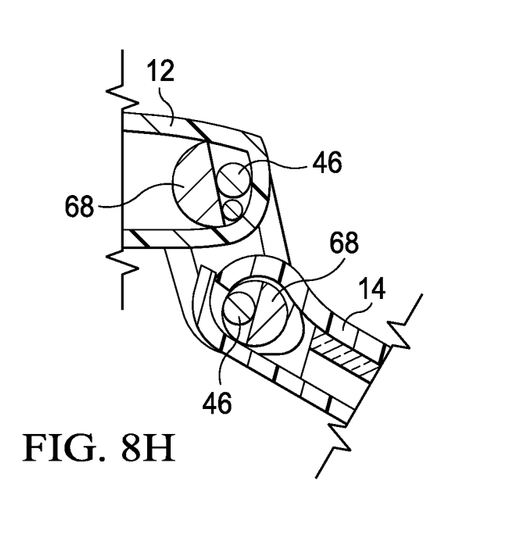
Figure 8I:
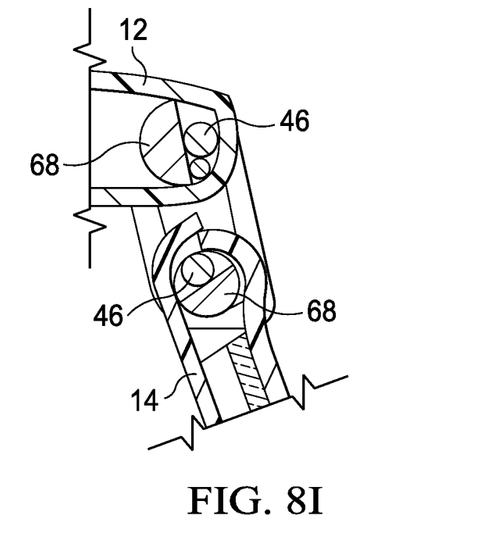
Figure 8J:
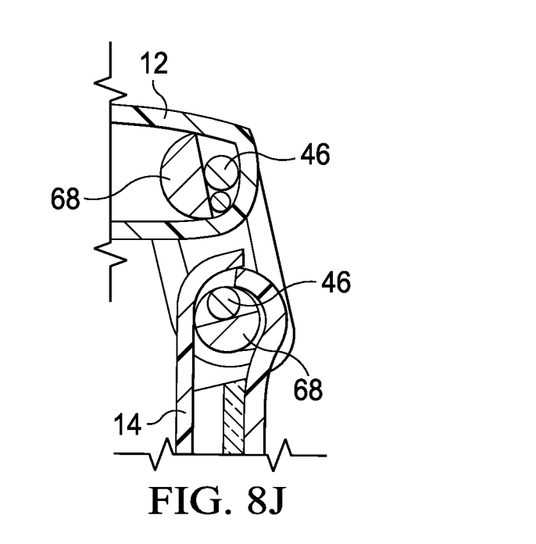
Figure 8K:
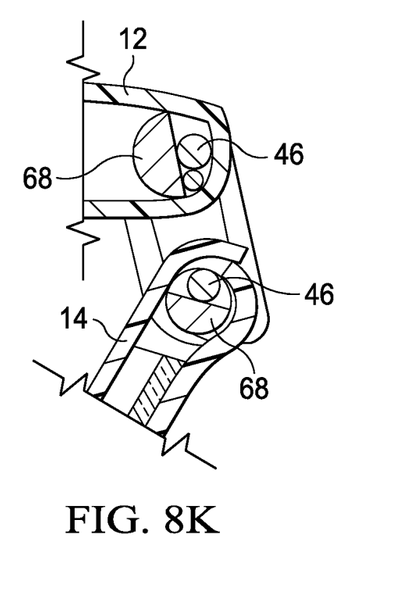
Figure 8L:
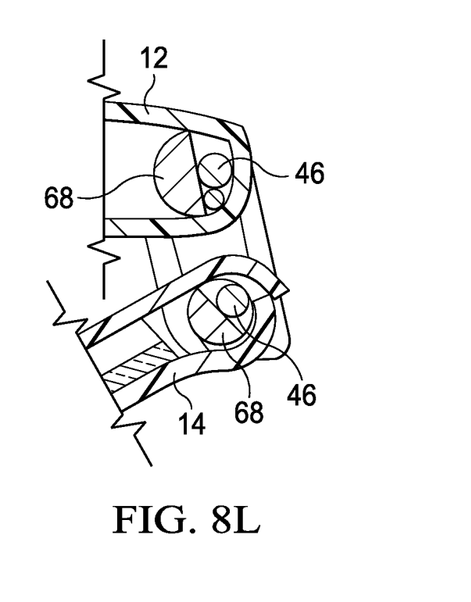
Figure 8M:
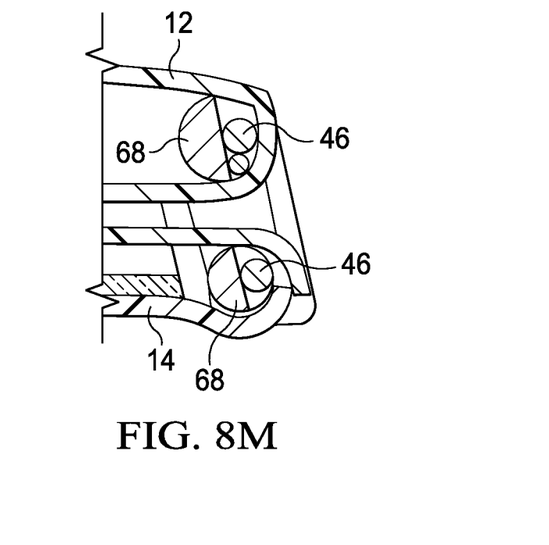

Referring now to FIGS. 8A through 8M, sequential rotation from a closed position depicted by FIG. 8A with zero rotation to a tablet position depicted by FIG. 8M with 360 degrees of rotation illustrates an example of sequential eccentric hinge rotation to support a low height mono barrel hinge. During rotation from the closed position of FIG. 8A to 180 degrees of rotation depicted by FIG. 8G, lid housing portion 14 rotates relative to main housing portion 12 about only the shaft 68 adjacent main housing portion 12. During the initial 180 degrees of rotation, lid housing portion 14 remains in a constant rotational position relative to the shaft 68 that is adjacent lid housing portion 14. As depicted by FIGS. 8A through 8G, the flat surface of shaft 68 proximate main housing portion 12 remains stationary relative to main housing portion 12 and the cable 46 adjacent the flat surface. This relative stationary orientation results from relative motion of lid housing portion 14 about shaft 68 proximate main housing portion 12 while shaft 68 remains fixed relative to main housing portion 12. In the example embodiment, the sequence of rotation is thus rotation of lid housing portion 14 about the shaft proximate main housing portion 12 for 180 degrees while rotational movement about the shaft proximate lid housing portion 14 is prevented. As depicted by FIGS. 8A through 8G, the flat surface of shaft 68 proximate lid housing portion 14 remains adjacent cable 46 as lid housing portion 14 rotates about the main housing portion shaft.

Once lid housing portion 14 has completed 180 degrees of rotation as depicted by FIG. 8G, rotational movement about shaft 68 of main housing portion 12 is prevented while rotation of lid housing portion 14 about the shaft 68 proximate lid housing portion 14 is permitted. As depicted by FIGS. 8G through 8M, lid housing portion rotates about the shaft proximate to it while the shaft 68 proximate the main housing portion 12 remains stationary. As shaft 68 rotates proximate lid housing portion 14, eccentric motion of shaft 68 around cable 46 maintains cable 46 adjacent the flat surface of shaft 68. After 360 degrees of rotation as depicted by FIG. 8M, cable 46 remains against the flat surface of shaft 68 aided by eccentric motion of shaft 68 around cable 46. Rotation is supported without interference by the sequential hinge element with cable 46 through a full 360 degrees of rotation. The rotational sequence provides rotation about the shaft 68 closest to the main housing portion followed by the shaft closest to the lid housing portion. In an alternative embodiment, the sequence may be performed in an opposite manner, such as with the lid shaft supporting rotation first, or may be performed in incremental sequences of smaller rotational movements.

Although the present invention has been described in detail, it should be understood that various changes, substitutions and alterations can be made hereto without departing from the spirit and scope of the invention as defined by the appended claims.

What is claimed is:

1. An information handling system comprising:
   first and second housing portions;
   processing components disposed in at least one of the first and second housing portions and operable to process information;
   a display disposed in at least one of the first and second housing portions, the display interfaced with the processing components and operable to present the information as visual images;
   a cable communicating information between the first and second housing portions; and
   a hinge rotationally coupling the first and second housing portions to each other, the hinge having a barrel with opposing ends and a sequential hinge element at each opposing ends, each sequential hinge element having first and second axles coupled to a sequencer, each axle having a flat surface facing the cable, the sequencer rotating the axles through 360 degrees of rotation of the housing portions so that the flat surface of each axle remains facing the cable.

2. The information handling system of claim 1 further comprising a guide disposed between the first and second axles, the cable routed from the first housing portion around an end of the first axle to the guide and around the second axle to the second housing portion.

3. The information handling system of claim 2 wherein the sequencer rotates the first and second axles as eccentric shafts.

4. The information handling system of claim 2 wherein the guide integrates within the barrel, the barrel enclosing around the hinge elements to capture the cable.

5. The information handling system of claim 4 further comprising a speaker integrated in the barrel between the hinge elements.

6. The information handling system of claim 4 further comprising a display integrated in the barrel between the hinge elements.

7. The information handling system of claim 1 wherein:
   the processing components include a graphics processor integrated in the first housing portion;
   the display integrates in the second housing portion; and
   the cable interfaces the graphics processor and display to communicate information from the graphics processor to the display for presentation on the display as visual images.

8. The information handling system of claim 7 further comprising a keyboard integrated in the first housing portion and operable to accept key inputs.

9. The information handling system of claim 8 wherein the sequencer rotates about the first axle proximate the first housing portion from the closed position to a predetermined open position before rotation about the second axle proximate the second housing portion.

10. A method for rotationally coupling first and second information handling system portions to each other, the method comprising:
    coupling first and second hinge elements to opposing ends of a barrel member;
    coupling the first and second hinge element to the first and second information handling system portions;
    routing a cable from the first to the second information handling system portions through the first hinge element, the first hinge element having first and second axles, the first and second axles having a flat side and a rounded side, the cable routed between the first and second axles adjacent the flat side of the first and second axles; and
    maintaining the first and second axle flat side adjacent the cable through 360 degrees of rotation of the first and second information handling system housing portions relative to each other.

11. The method of claim 10 wherein the maintaining the first and second axle flat side adjacent the cable through 360 degrees of rotation of the first and second information handling system housing portions relative to each other further comprises:
    rotating the first information handling system housing portion 180 degrees relative to the second information handling system housing portion about the first axle while preventing rotation about the second axle; and rotating the first information handling system housing portion 180 degrees relative to the second information handling system housing portion about the second axle while preventing rotation about the first axle.

12. The method of claim 10 wherein the maintaining the first and second axle flat side adjacent the cable through 360 degrees of rotation of the first and second information handling system housing portions relative to each other further comprises rotating the first and second axles about an axis aligned with the flat side.

13. The method of claim 10 wherein the routing the cable further comprises:
integrating a cable guide in the barrel member between the first and second axles; and
routing the cable adjacent the first axle, around the cable guide and adjacent the second axle.

14. The method of claim 10 wherein the first and second axles rotate with an eccentric motion about the cable.

15. The method of claim 10 further comprising:
integrating a keyboard in the first information handling system portion;
integrating a display in the second information handling system portion; and
sequencing the first axle adjacent the keyboard to rotate from a closed position to a predetermined open position before rotating the second axle adjacent the display from the open position to a tablet position.

16. The method of claim 15 wherein the cable comprises a display cable that communicates display information from a graphics processor to the display.

17. A hinge comprising:
a barrel element having opposing ends;
first and second hinge elements integrated into the barrel element at the opposing ends, each hinge element having a sequencer that sequences movement of first and second axles, each axle having a flat surface; and
a cable routed through the first and second axles of at least one of the first and second hinge elements;
wherein the sequencer coordinates rotation about the first and second axles to maintain each flat surface adjacent the cable.

18. The hinge of claim 17 wherein the cable comprises a display cable.

19. The hinge of claim 17 further comprising a cable guide integrated in the barrel element and aligned to extend between the first and second axles, the cable routed around the cable guide.

20. The hinge of claim 17 further comprising a speaker integrated in the barrel element.

* * * * *